US010791724B2

(12) United States Patent
Hyun

(10) Patent No.: US 10,791,724 B2

(45) Date of Patent: Oct. 6, 2020

(54) FISHING REEL HAVING PINION SUPPORT STRUCTURE

(71) Applicant: DOYO ENGINEERING CO., LTD., Bucheon (KR)

(72) Inventor: Kang Ho Hyun, Bucheon (KR)

(73) Assignee: DOYO ENGINEERING CO., LTD., Bucheon (KR)

( * ) Notice: Subject to any disclaimer, the term of this patent is extended or adjusted under 35 U.S.C. 154(b) by 0 days.

(21) Appl. No.: 16/407,683

(22) Filed: May 9, 2019

(65) Prior Publication Data

US 2019/0343104 A1 Nov. 14, 2019

(30) Foreign Application Priority Data

May 10, 2018 (KR) ........................ 10-2018-0053683

(51) Int. Cl.
*A01K 89/01* (2006.01)
*A01K 89/015* (2006.01)

(52) U.S. Cl.
CPC .... *A01K 89/01931* (2015.05); *A01K 89/0192* (2015.05); *A01K 89/01* (2013.01); *A01K 89/0186* (2015.05)

(58) Field of Classification Search
CPC .......... A01K 89/0188; A01K 89/01901; A01K 89/0186; A01K 89/01931; A01K 89/0193
See application file for complete search history.

(56) References Cited

U.S. PATENT DOCUMENTS 4,474,339 A * 10/1984 Sato .................... A01K 89/0189 242/300
4,512,536 A * 4/1985 Sato .................... A01K 89/0192 242/261
4,570,878 A * 2/1986 Nakajima .......... A01K 89/0155 242/261
4,585,188 A * 4/1986 Sato ................. A01K 89/01555 242/261
4,634,079 A * 1/1987 Furomoto ........ A01K 89/01907 242/249
4,919,360 A * 4/1990 Roberts ............ A01K 89/01901 242/260

(Continued)

FOREIGN PATENT DOCUMENTS

JP 2017085964 5/2017
KR 2019980062167 11/1998

(Continued)

*Primary Examiner* — Emmanuel M Marcelo

(74) *Attorney, Agent, or Firm* — Cantor Colburn LLP

(57) ABSTRACT

Provided is a fishing reel having a pinion support structure. The fishing reel is configured such that a spool shaft and a pinion are spaced apart from each other without being in contact with each other, so that it is possible to prevent reduction in casting distance and noise generation during casting due to friction between the spool shaft and the pinion. The fishing reel includes: a spool shaft provided such that opposite ends thereof are mounted axially between opposite side covers, and including a main shaft and a pinion shaft; and a clutch means fitted over the pinion shaft and moved forward and backward in a longitudinal direction of the pinion shaft, and including a pinion which is provided with a stopper at a second end portion to be engaged with the fastening pin.

7 Claims, 16 Drawing Sheets

(56) References Cited

U.S. PATENT DOCUMENTS

| | | | | | |
|---|---|---|---|---|---|
| 5,639,038 | A * | 6/1997 | Hirose | G01L 5/04 | 242/223 |
| 5,791,576 | A * | 8/1998 | Miyazaki | A01K 89/0189 | 242/261 |
| 5,855,330 | A * | 1/1999 | Kobayashi | A01K 89/01901 | 242/261 |
| 2015/0090823 | A1* | 4/2015 | Kobayashi | A01K 89/015 | 242/261 |
| 2015/0181853 | A1* | 7/2015 | Niitsuma | A01K 89/015 | 242/257 |
| 2015/0264906 | A1* | 9/2015 | Miyamoto | A01K 89/006 | 242/321 |
| 2018/0064083 | A1* | 3/2018 | Ikuta | A01K 89/01931 | |
| 2018/0092343 | A1* | 4/2018 | Takechi | A01K 89/01901 | |

FOREIGN PATENT DOCUMENTS

| | | |
|---|---|---|
| KR | 200227044 | 6/2001 |
| KR | 100382814 | 5/2003 |
| KR | 20060045676 | 5/2006 |
| KR | 100791733 | 1/2008 |
| KR | 20120033241 | 4/2012 |
| KR | 20150062981 | 6/2015 |
| WO | 0228177 | 4/2002 |

* cited by examiner

FISHING REEL HAVING PINION SUPPORT STRUCTURE

BACKGROUND OF THE INVENTION

Field of the Invention

The present invention generally relates to a fishing reel having a pinion support structure. More particularly, the present invention relates to a fishing reel having a pinion support structure, in which the pinion support structure is provided to maintain a non-contact state between a spool shaft and a pinion so that the spool shaft and the pinion are in non-contact with each other during casting, thereby preventing reduction in casting distance, noise generation, breakage of a ball-bearing that supports the pinion, and foreign matter adherence, and stably supporting outer and inner circumferential surfaces of the pinion according to forward and backward movements of the pinion according to clutch-on and clutch-off states of the pinion.

Description of the Related Art

Generally, a bait-casting reel (hereinafter, which is referred to a fishing reel) differs from the same type reels only in an operation structure of a brake dial or a tension nut according to a braking manner of a spool, but has the same components such as a frame provided with the spool; a palm-side first side cover coupled to a first side surface of the frame; a gear-side second side cover coupled to a second side surface of the frame; a handle provided at the second side cover; and a clutch means that allows the spool to perform free rotation during casting and controls rotation of the spool to be turned on and off so that the spool is rotated by being interconnected to the handle.

In the conventional fishing reel, opposite end portions of a spool shaft are integrally formed, and one end portion is connected to a tension force control member of the tension nut.

When the tension nut is tightened in an inside direction of a nut mounting portion, rotational speed of the spool decreases due to increasing of pressure (tension force) applied to the spool shaft, whereas when the tension nut is loosened in an outside direction of the nut mounting portion, the rotational speed of the spool increases due to decreasing of the pressure applied to the spool shaft.

Here, a pinion of the clutch means is fitted over one end portion of the spool shaft.

When a clutch bar is operated, the pinion is moved forward and engaged with the spool shaft, so that the spool does not perform free rotation and is controlled to be rotated only by manipulating the handle.

On the contrary, when the clutch bar is released, the pinion is moved backward and disengaged with the spool shaft, so that the spool performs free rotation and is controlled to perform casting.

However, in the conventional fishing reel, since a portion at which the pinion is fitted over the spool shaft (hereinafter, which is referred to a side connecting portion) is integrally formed, contact and friction occur between the pinion and the side connecting portion due to shaking or defective concentricity of the pinion, and thus casting distance is reduced and noise (allophone) is generated.

In order to solve this problem, as shown in FIGS. 9A and 9B, the conventional fishing reel is configured such that an outer diameter of the side connecting portion of the spool shaft 120 is formed to be smaller than an inner diameter of the pinion 131, thereby preventing contact and friction between the spool shaft 120 and the pinion 131. In addition, the fishing reel has ball-bearings BI at the nut mounting portion and the frame to support outer circumferential surfaces of the spool shaft 120 and the pinion 131, respectively, so that the pinion 131 is prevented from being shaken.

However, in the conventional fishing reel, since the pinion 131 is supported only by a side (a right side in the drawings) bearing BI while the pinion is moved backward for a clutch-off state, a second end portion of the pinion 131 is shaken to cause contact and friction between the pinion 131 and the spool shaft 120. In addition, load generated when fishing line is wound to the spool SI and load generated by rotation of the pinion 131 are transmitted to the ball-bearing BI and damage the ball-bearing, thereby causing clutch operation trouble.

For reference, as the related-art documents of the present invention, Korean Patent Application Publication No. 10-2012-0033241, Korean Patent Application Publication No. 10-2015-0062981, Korean Patent Application Publication No. 10-2006-0045676, and Korean Patent No. 10-0791733 are disclosed.

DOCUMENTS OF RELATED ART (Patent Document 1) Korean Patent Application Publication No. 10-2012-0033241;

(Patent Document 2) Korean Patent Application Publication No. 10-2015-0062981;

(Patent Document 3) Korean Patent Application Publication No. 10-2006-0045676; and (Patent Document 4) Korean Patent No. 10-0791733.

SUMMARY OF THE INVENTION

Accordingly, the present invention has been made keeping in mind the above problems occurring in the related art, and the present invention is intended to propose a fishing reel, in which a spool shaft and a pinion are spaced apart from each other without being in contact with each other, thereby preventing reduction in casting distance and noise generation during casting due to friction between the spool shaft and the pinion that controls rotation of the spool shaft to be turned on and off.

In addition, the fishing reel of the present invention allows the spool shaft to support the pinion according to clutch-on and clutch-off states of the pinion.

In addition, when the spool is separated from the pinion, the pinion is locked, whereby the fishing reel prevents shaking of the pinion when spool is rotated by a handle, and prevents a gear from being damaged.

In order to achieve the above object, according to one aspect of the present invention, there is provided a fishing reel includes: a separable spool shaft provided such that opposite ends thereof are mounted axially between opposite side covers, and including a main shaft and a pinion shaft, the main shaft penetrating a spool and having a fastening pin and an accommodating portion at a first end portion of the main shaft, and the pinion shaft being separated from the first end portion of the main shaft and having a head portion at a second end portion of the pinion shaft, wherein the head portion is inserted into the accommodating portion and idles; and a clutch means fitted over the pinion shaft and moved forward and backward in a longitudinal direction of the pinion shaft, and including a pinion which is provided with a stopper at a second end portion thereof to be engaged with the fastening pin, the pinion controlling rotation of the main shaft to be turned on and off, as the stopper is spaced apart from the accommodating portion and moved forward and backward in a backward state at which the pinion is in a clutch-off state, wherein the pinion shaft may have a smaller outer diameter than an inner diameter of the pinion, an outer circumferential surface of the pinion shaft and an inner circumferential surface of the pinion may be in non-contact with each other.

The fishing reel further includes: a support means provided at the spool shaft, and supporting the pinion by being in contact with the inner circumferential surface of the pinion only in a forward state at which the pinion is in clutch-on state; and a first support member continuously supporting the pinion by being in contact with an outer circumferential surface of one end portion of the pinion.

The support means may be configured of a first protrusion, which may protrude from an outer circumferential surface of the accommodating portion and be in contact with an inner circumferential surface of the stopper.

The support means may be configured of a second protrusion, which may protrude so that an outer diameter of the head portion may be larger than the outer diameter of the pinion shaft and be extended to be exposed toward one side of the accommodating portion, thereby being in contact with the inner circumferential surface of the pinion.

The support means may be configured of a third protrusion, which may protrude so that a part of the outer circumferential surface of the pinion shaft may have a larger outer diameter than the remaining part of the outer circumferential surface thereof, thereby being in contact with the inner circumferential surface of the pinion.

The fishing reel of the present invention may include: an integral spool shaft provided such that opposite ends thereof are mounted axially between opposite side covers, and including a main shaft and a pinion shaft, the main shaft penetrating a spool and provided with a fastening pin at a first end portion of the main shaft, and the pinion shaft being integrally connected to the first end portion of the main shaft; and a clutch means fitted over the pinion shaft and moved forward and backward in a longitudinal direction of the pinion shaft, and including a pinion which is provided with a stopper at a second end portion thereof to be engaged with the fastening pin, the pinion controlling rotation of the spool shaft to be turned on and off, as the stopper is spaced apart from the fastening pin and moved forward and backward spaced in a backward state at which the pinion is in a clutch-off state, wherein the pinion shaft has an outer diameter smaller than an inner diameter of the pinion, and an outer circumferential surface of the pinion shaft and an inner circumferential surface of the pinion are in non-contact with each other.

The fishing reel may further include: a support means provided at the spool shaft and supporting the pinion by being in contact with the inner circumferential surface of the pinion only in a forward state at which the pinion is in a clutch-on state; and a first support member continuously supporting the pinion by being in contact with an outer circumferential surface of one end portion of the pinion.

The support means may be configured of a first protrusion, which may protrude from the main shaft and be in contact with an inner circumferential surface of the stopper.

The support means may be configured of a second protrusion, which may protrude so that a part of the outer circumferential surface of the pinion shaft may have a larger diameter than the remaining part thereof, thereby being in contact with the inner circumferential surface of the pinion.

The fishing reel of the present invention may include: a separable spool shaft provided such that opposite ends thereof are mounted axially between opposite side covers, and including a main shaft and a pinion shaft, the main shaft penetrating a spool and having a fastening pin and an accommodating portion at a first end portion, and the pinion shaft being separated from the first end portion of the main shaft and having a head portion at a second end portion, wherein the head portion idling in the accommodating portion; and a clutch means fitted over the pinion shaft and moved forward and backward in a longitudinal direction of the pinion shaft, and including a pinion provided with a stopper at a second end portion thereof to be engaged with the fastening pin, the pinion controlling rotation of the main shaft to be turned on and off, as the stopper is spaced apart from the accommodating portion and moved forward and backward in a backward state at which the pinion is in a clutch-off state, wherein the pinion shaft has an outer diameter smaller than an inner diameter of the pinion, and an outer circumferential surface of the pinion shaft and an inner circumferential surface of the pinion are in non-contact with each other.

The fishing reel may further include: a support means protruding from an outer circumferential surface of the accommodating portion, and configured of a first protrusion supporting the pinion by being in contact with an inner circumferential surface of the stopper only in a forward state at which the pinion is in a clutch-on state, and of a fourth protrusion provided at the spool shaft and continuously supporting the pinion by being in contact with the inner circumferential surface of the pinion; and a first support member continuously supporting the pinion by being in contact with an outer circumferential surface of one end portion of the pinion.

The fishing reel may further include: a friction reducing bushing which is in non-contact with an outer circumferential surface of the stopper while covering the outer circumferential surface thereof.

The fishing reel may further include: a second support member which supports the pinion by being in contact with the outer circumferential surface of the stopper.

According to the present invention, the fishing reel having the pinion support structure is configured such that the separable spool shaft or the integral spool shaft is in non-contact with an inner circumferential surface of the pinion so that the pinion and the main shaft are spaced apart from each other in the clutch-off state. Accordingly, when the spool is rotated, contact and friction between the main shaft and the pinion does not occur.

Since the pinion shaft continuously supports the pinion during removing the spool, the gear can be prevented from being damaged due to gear skew occurring when the pinion is rotated by the handle.

By stably supporting the pinion while completely preventing the contact and friction between the pinion shaft and the pinion, the fishing reel can have the excellent effect of preventing reduction in casting distance and noise generation.

By reducing the friction between the main shaft and the pinion shaft, casting distance can be increased during casting with the two-state spool shaft and the non-contact pinion, and noise generation can be suppressed, thereby using the fishing reel more efficiently and conveniently.

In the separable spool shaft or the integral spool shaft, by supporting the stopper of the pinion that is rotated while being separated from the spool shaft and being in non-contact with the stopper of the pinion, components of the fishing reel can be prevented from being broken.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
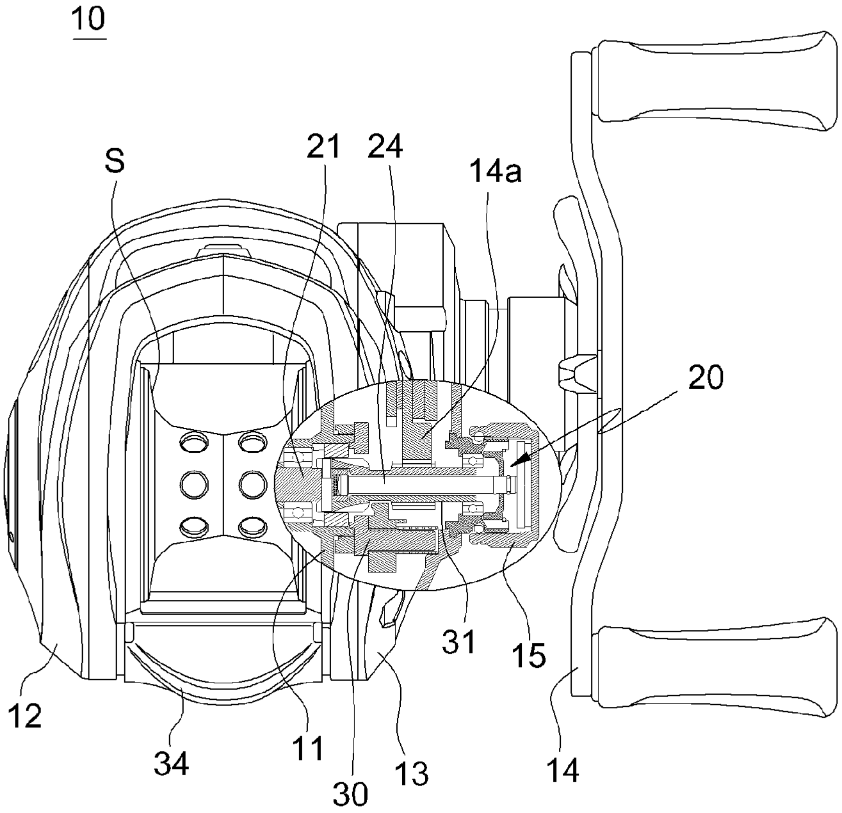
FIG. 1 is a plan view of a fishing reel according to the present invention and a cross-sectional view showing a main part of the fishing reel in a circle.

The present invention will now be described in detail on the basis of aspects (or embodiments). The present invention may, however, be embodied in many different forms and should not be construed as being limited to only the embodiments set forth herein, but should be construed as covering modifications, equivalents or alternatives falling within ideas and technical scopes of the present invention.

In the figures, like reference numerals, particularly, reference numerals having the same last two digits or the same last two digits and letters refer to like elements having like functions throughout, and unless the context clearly indicates otherwise, elements referred to by reference numerals of the drawings should be understood on the basis of this standard.

Also, for convenience of understanding of the elements, in the figures, sizes or thicknesses may be exaggerated to be large (or thick), may be expressed to be small (or thin) or may be simplified for clarity of illustration, but due to this, the protective scope of the present invention should not be interpreted narrowly.

The terminology used herein is for the purpose of describing particular aspects (or embodiments) only and is not intended to be limiting of the present invention. As used herein, the singular forms are intended to include the plural forms as well, unless the context clearly indicates otherwise.

It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the present invention belongs. It will be further understood that terms used herein should be interpreted as having a meaning that is consistent with their meaning in the context of this specification and the relevant art and will not be interpreted in an idealized or overly formal sense unless expressly so defined herein.

Terms such as 'a first ~' and 'a second ~' are used only for the purpose for distinguishing a constitutive element from other constitutive elements, but the constitutive element should not be limited to a manufacturing order, and the terms described in the detailed description of the invention may not be consistent with those described in the claims.

Figure 2A:
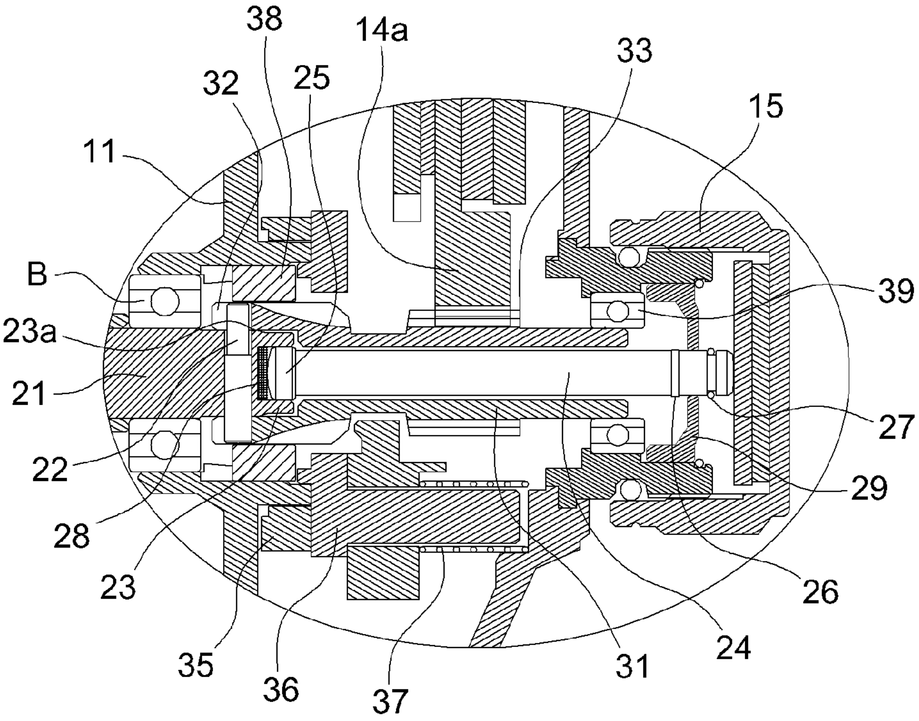
FIGS. 2A to 8B are cross-sectional views showing a main part of each of embodiments of the present invention.

For convenience of the description of a fishing reel having a pinion support structure according to the present invention, when an approximate direction rather than a precise direction is specified with reference to FIG. 2A, a lower side is determined on the basis of a direction to which gravity is applied, and up and down directions and right and left directions are determined on the basis of the lower side. This standard may be also applied to the other drawings, and directions may be specified and described on the basis of this standard unless the detailed description of the invention and the claims specially indicate otherwise.

Hereinbelow, the fishing reel with the pinion support structure according to the present invention will be described with reference to the accompanying drawings.

As shown in FIGS. 1 to 8B, the fishing reel according to the present invention is configured such that a palm-side first side cover 12 and a gear-side second side cover 13 are mounted to opposite sides of a frame 11, the second side cover 13 is provided with a handle 14 and a the tension nut 15, a spool S that is interconnected to the handle 14 by a clutch means 30 is axially provided between both side covers 12 and 13 by a spool shaft 20 in the frame 11, and a the main body 10 is made of above-mentioned components.

A first end of the spool shaft 20 is extended to be connected to a tension control means (not numbered) so as to control rotation speed of the spool S by controlling tension using the tension nut 15.

The present invention is intended to provide a non-contact support structure between a separable spool shaft 20 or an integral spool shaft 20' and a pinion 31, thereby solving a problem of reduction in casting distance and noise generation during casting.

Hereinafter, a first embodiment applying the separable spool shaft 20 will be firstly described, and then a second embodiment to which the integral spool shaft 20' is applied will be described.

As shown in FIGS. 2A to 6, the first embodiment of the present invention includes the separable spool shaft 20 and the clutch means 30.

The separable spool shaft 20 is provided such that opposite ends thereof are axially mounted between the opposite side covers 12 and 13, and includes a main shaft 21 and a pinion shaft 24, the main shaft 21 being connected to the spool S and having a fastening pin 22 and an accommodating portion 23 at a first end portion (a right side in the drawings) of the main shaft, the pinion shaft 24 being separated from the first end portion of the main shaft 21 and having a head portion 25 at a second end portion (a left side in the drawings) of the pinion shaft, wherein the head portion 25 is inserted into the accommodating portion 23 and idles.

The clutch means 30 is fitted over the pinion shaft 24 and moved forward and backward in a longitudinal direction of the pinion shaft 24, and includes the pinion 31 which is provided with a stopper 32 at a second end portion of the pinion to be engaged with the fastening pin 22. The pinion 31 controls rotation of the main shaft 21 to be turned on and off depending on forward and backward movement of the clutch means 30, as the stopper 32 is spaced apart from the accommodating portion 23 in a backward state at which the pinion 31 is in a clutch-off state.

The main shaft 21 is supported by rolling a ball-bearing B mounted on a shaft mounting portion of the frame 11, and is rotated with being interconnected to the handle 14 in a clutch-on state, and performs free rotation regardless of the handle 14, so that casting is performed in a clutch-off state.

The fastening pin 22 is fitted into a slit groove that is provided in the stopper 32 of the pinion 31, the stopper 32 protruding from an second side end of the accommodating portion 23 and being extended in a direction of the second side, thus the spool shaft 20 and the pinion 31 are interconnected to each other and may be rotatable.

The head portion 25 is inserted into the accommodating portion 23, and thus the main shaft 21 and the pinion shaft 24 idle together.

As a friction reducing member 28 such as a lubricating washer is provided between the accommodating portion 23 and the head portion 25, when casting, the friction occurring between a rotating main shaft 21 and a non-rotating pinion shaft 24 is reduced and casting distance can be increased.

The pinion shaft 24 is a longitudinal extension of the main shaft 21 so that pressure change due to the tension nut 15 is transmitted to the main shaft 21. Especially, in the first embodiment, the pinion shaft 24 is provided as a separate type rather than an integral type with the main shaft 21.

The pinion shaft 24 is interconnected to the main shaft 21 to idle together by male-female engagement of the accommodating portion 23 and the head portion 25.

When the tension nut 15 is tightened, the pinion shaft 24 reduces rotation speed of the spool shaft 20 (that is, the spool S) by transmitting pressure applied to the main shaft 21. When the tension nut 15 is loosened, the pinion shaft 24 increases rotation speed of the spool S by reducing pressure applied to the main shaft 21.

Undescribed reference numerals 26 and 27 are separation preventing parts that protrude to be engageable with both sides of a holder 29 provided in a nut mounting part. A separation preventing part 27 of a first side is formed of a rubber or silicone O-ring, so that the pinion shaft 24 may be pulled out toward the second side to be removable from the holder 29 when necessary.

The clutch means 30 is operated as follows, when a clutch bar 34 is operated, a yoke 36 is moved in the first side direction by a clutch aim 35 to move the pinion 31 backward, as the stopper 32 is spaced apart from the fastening pin 22, interconnection between the main shaft 21 and the pinion 31, that is, interconnection between the spool S and the handle 14 is released, and the spool S may perform free rotation during casting.

When operation of the clutch bar 34 is released, the yoke 36 is moved in the second side direction by a spring 37 and moves the pinion 31 forwardly, and then the stopper 32 is engaged with the fastening pin 22. Therefore, the main shaft 21 and the pinion 31, that is, the spool S and the handle 14 are interconnected to each other, and the spool S is rotatable only by the handle 14, so that the fishing line can be wound or unwound.

Undescribed reference numeral **14*a* is a drive gear of a gear set connected to the handle 14, and is engaged with a toothed gear 33 provided at an outer circumferential surface of the pinion 31. The drive gear 14*a* and the toothed gear 33 are continuously engaged with each other regardless of the forward and backward movement of the pinion 31. Therefore, through above-described operation of gears, the spool S is rotated by rotating the pinion 31 engaged with the main shaft 21 by the handle 14 in the clutch-on state, and rotation of the pinion 31** is suppressed in the clutch-off state.

As described above, since the main shaft 21 and the pinion shaft 24 are interconnected to each other to idle together, when the main shaft 21 is rotated due to casting, the pinion shaft 24 is not rotated. Therefore, no contact and friction between the pinion shaft 24 and the pinion 31 occur so that casting distance is increased and noise during casting is not generated.

In addition, by using the friction reducing member 28, friction between the main shaft 21 and the pinion shaft 24 may be removed to prevent casting distance from being reduced.

In addition, even when the spool S is separated from the frame after opening the first side cover 12 for maintenance or repair of fishing reel, only the main shaft 21 is removed with the spool S and the pinion shaft 24 continuously maintains engagement with the second side cover 13. Therefore, as the pinion 31 is rotated by manipulating the handle 14, the engagement structure of gears is prevented from being released, thereby preventing the drive gear **14*a* and/or the toothed gear 33** from being damaged.

In addition, the pinion shaft 24 has a smaller outer diameter than an inner diameter of the pinion 31, so that an outer circumferential surface of the pinion shaft 24 and an inner circumferential surface of the pinion 31 are in non-contact with each other.

Therefore, when the pinion is in the clutch-off state and the pinion 31 performs free rotation, friction between the non-rotated pinion shaft 24 and the rotated pinion 31 may be prevented.

When the pinion is in the clutch-off state, even when the pinion 31 is spaced apart from the main shaft 21, as the pinion shaft 24 is inserted into the pinion 31 while being axially engaged, opposite end portions of the pinion 31 are shaken and are in contact with the pinion shaft 24 to generate noise during casting. When the pinion is in the clutch-on state, contact and friction between the pinion 31 and the pinion shaft 24 occurs due to defective concentricity of the pinion 31 when the pinion 31 is rotated, whereby load may be increased or noise may be generated.

In order to solve the above-described problem, the present invention introduces first and second support members 39 and 38, which support the outer circumferential surface of the pinion 31 and a support means that supports the inner circumferential surface of the pinion 31 to the fishing reel.

Specifically, as shown in FIGS. 2A to 4B, the fishing reel of the present invention includes: the support means provided at the spool shaft 20, and being in contact with the inner circumferential surface of the pinion 31 in the forward state at which the pinion 31 is in the clutch-on state; a first support member 39 continuously supporting the pinion 31 by being in contact with an outer circumferential surface of an first end portion of the pinion 31; and a second support member 38 supporting the pinion 31 by being in contact with an outer circumferential surface of the stopper 32.

That is, even when an outer diameter of the pinion shaft 24 is different from the inner diameter of the pinion 31, when there is no support structure for suppressing shaking of the pinion 31, the pinion 31 may be shaken due to gap between the pinion shaft 24 and the pinion 31. Therefore, the problem described above is solved by supporting the outer circumferential surface of the pinion 31 by using the support means and the first support member 39.

When the pinion 31 is rotated (that is, in the clutch-on state), a ball-bearing or a friction reducing bushing may be used for the first and second support members 39 and 38 to reduce friction between the pinion 31 and the first and second support members 39 and 38. In the accompanying drawings, the first support member 39 is the ball-bearing, and the second support member 38 is the friction reducing bushing.

As shown in FIGS. 2A to 4B, the first support member 39 is provided in an inner side of a nut mounting portion to which the tension nut 15 is mounted, and the second support member 38 is provided in an inner side of the shaft mounting portion of the frame 11. Regardless of forward and backward states of the pinion 31, the first and second support members 39 and 38 continuously support the opposite end portions of the pinion 31 to suppress shaking of the pinion 31.

As shown in FIGS. 2A to 5B, the support means is in contact with the inner circumferential surface of the pinion 31 only in the clutch-on state of the pinion 31 and supports the pinion 31. The support means is provided by protruding from an outer circumferential surface of the spool shaft 20.

Figure 2B:
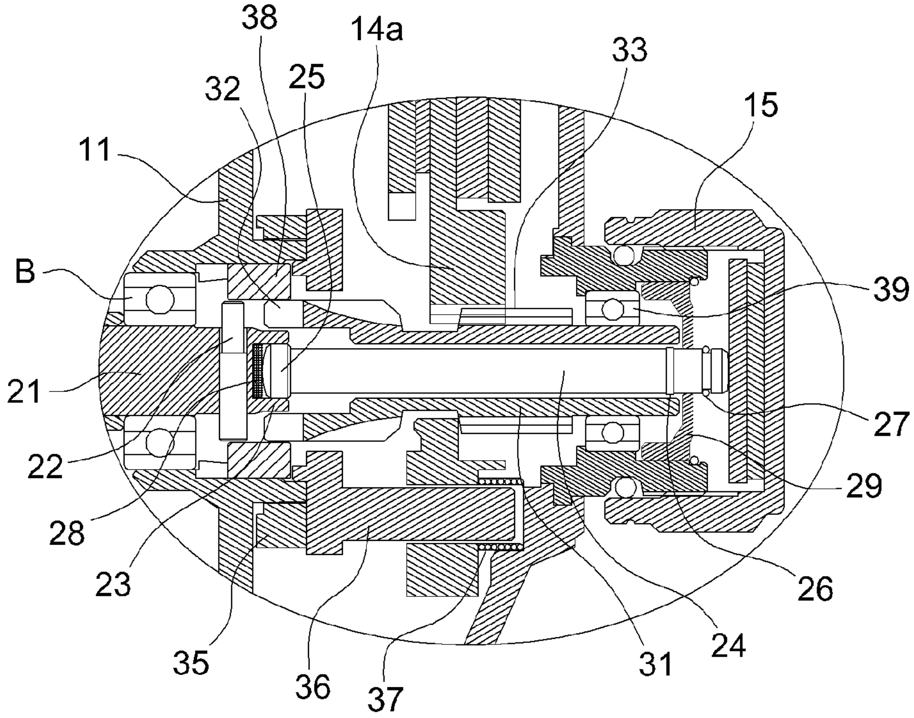

Specifically, as shown in FIGS. 2A and 2B, the support means is a first protrusion 23*a* that protrudes from an outer circumferential surface of the accommodating portion 23 and is in contact with an inner circumferential surface of the stopper 32.

That is, a connection portion between the main shaft 21 and the accommodating portion 23 is formed into a tapered shape having a smaller diameter toward the first side direction, so that a larger diameter portion is disposed as the first protrusion 23*a* where the inner circumferential surface of the stopper 32 contacts.

When the pinion 31 is moved forward, the first protrusion 23*a* supports the inner circumferential surface of the stopper 32 to prevent an axis from being twisted when the pinion 31 and the main shaft 21 are rotated together by the handle 14. When the pinion 31 is moved backward, the stopper 32 is separated from the first protrusion 23*a* thereby preventing contact and friction from occurring between the rotated main shaft 21 and the non-rotated the pinion 31 during casting.

Figure 3A:
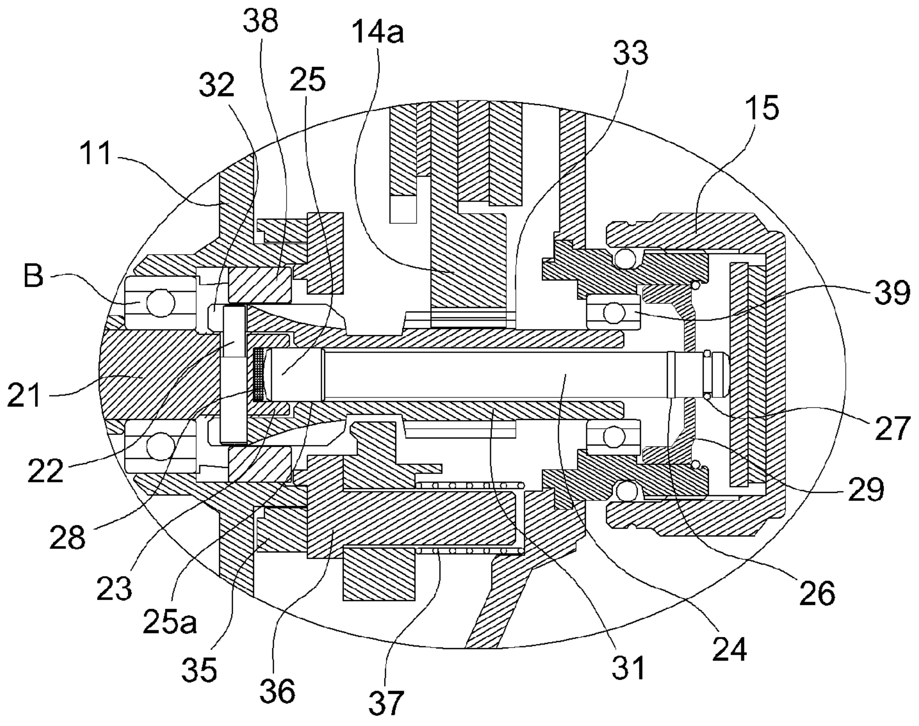
Figure 3B:
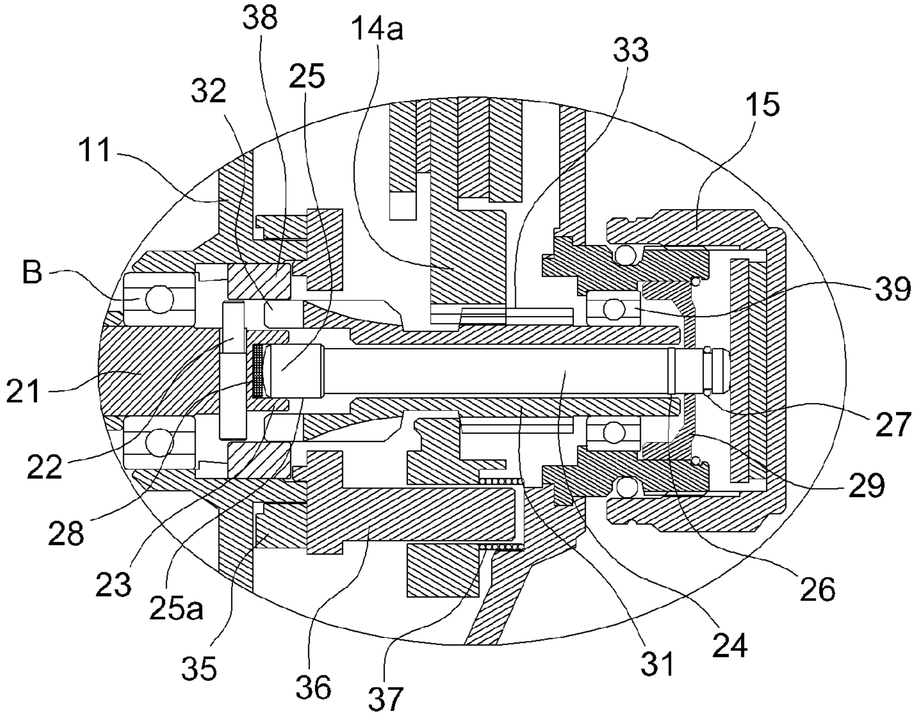

As shown in FIGS. 3A and 3B, the support means is a second protrusion 25*a*. The second protrusion 25*a* is provided such that an outer diameter of the head portion 25 is larger than the outer diameter of the pinion shaft 24 and is extended to be exposed toward a side of the accommodating portion 23, thereby being in contact with the inner circumferential surface of the pinion 31.

That is, the outer circumferential surface of the head portion 25 is formed to have the same size as the inner circumferential surface of the pinion 31 and a length of the head portion 25 is formed to be longer than a groove depth of the accommodating portion 23. That is, the outer surface of the protruding head portion 25 functions as the second protrusion 25*a*.

Accordingly, when the pinion 31 is moved forward, the second protrusion 25*a* supports the inner circumferential surface of the pinion 31 to prevent axis from being twisted when the pinion 31 and the main shaft 21 are rotated together by the handle 14. When the pinion 31 is moved backward, the inner circumferential surface of the pinion 31 is separated from the head portion 25 thereby preventing contact or friction from occurring between the rotated main shaft 21 and the non-rotated pinion 31 during casting.

Figure 4A:
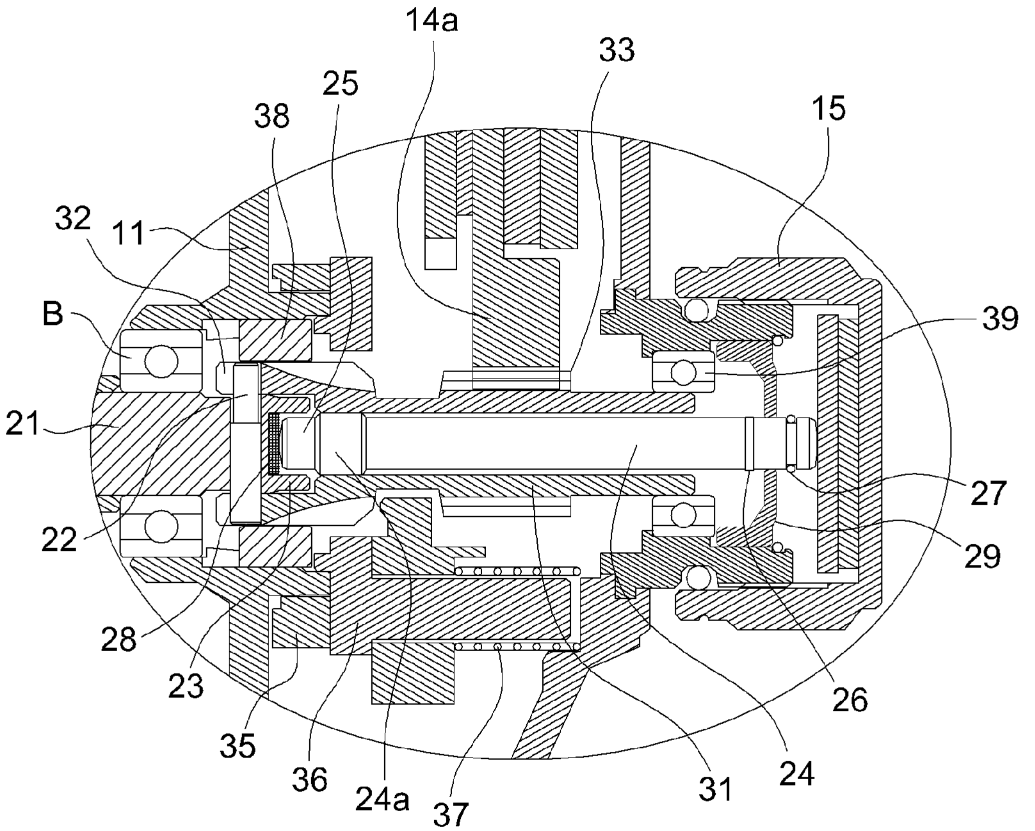
Figure 4B:
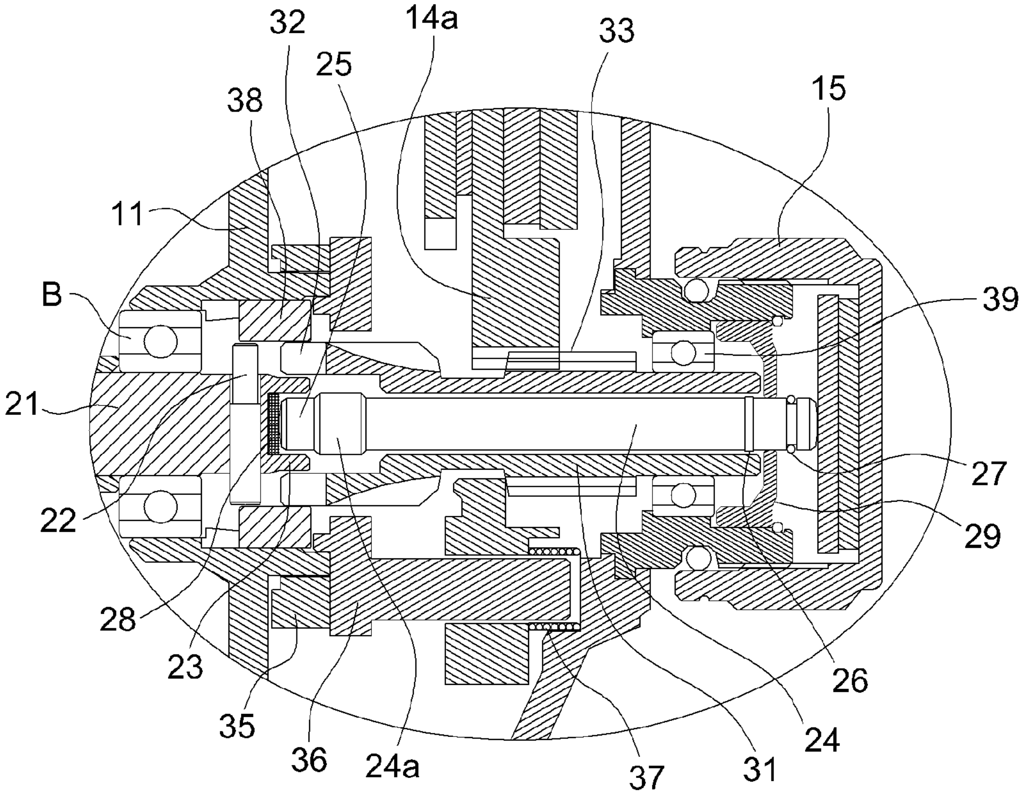

As shown in FIGS. 4A and 4B, the support means is a third protrusion 24*a*. The third protrusion 24*a* protrudes so that a part of the outer circumferential surface of the pinion shaft 24 has a larger diameter than a diameter of the remaining part of the outer circumferential surface, thereby being in contact with the inner circumferential surface of the pinion 31.

That is, the pinion shaft 24 is provided with the third protrusion 24*a* at a position spaced a predetermined distance toward one side of the head portion 25, so that the pinion shaft 24 has the same diameter as the inner circumferential surface of the pinion 31.

Therefore, when the pinion 31 is moved forward, the third protrusion 24*a* supports the inner circumferential surface of the pinion 31 to prevent axis from being twisted when the pinion 31 and the main shaft 21 are rotated together by the handle 14. When the pinion 31 is moved backward, the inner circumferential surface of the pinion 31 is prevented from being separated from the third protrusion 24*a*, thereby preventing contact and friction from occurring between the rotated main shaft 21 and the non-rotated pinion 31 during casting.

Here, the number of the third protrusion 24*a* is not limited as long as the third protrusion 24*a* can support the pinion 31 in the clutch-on state.

Figure 5A:
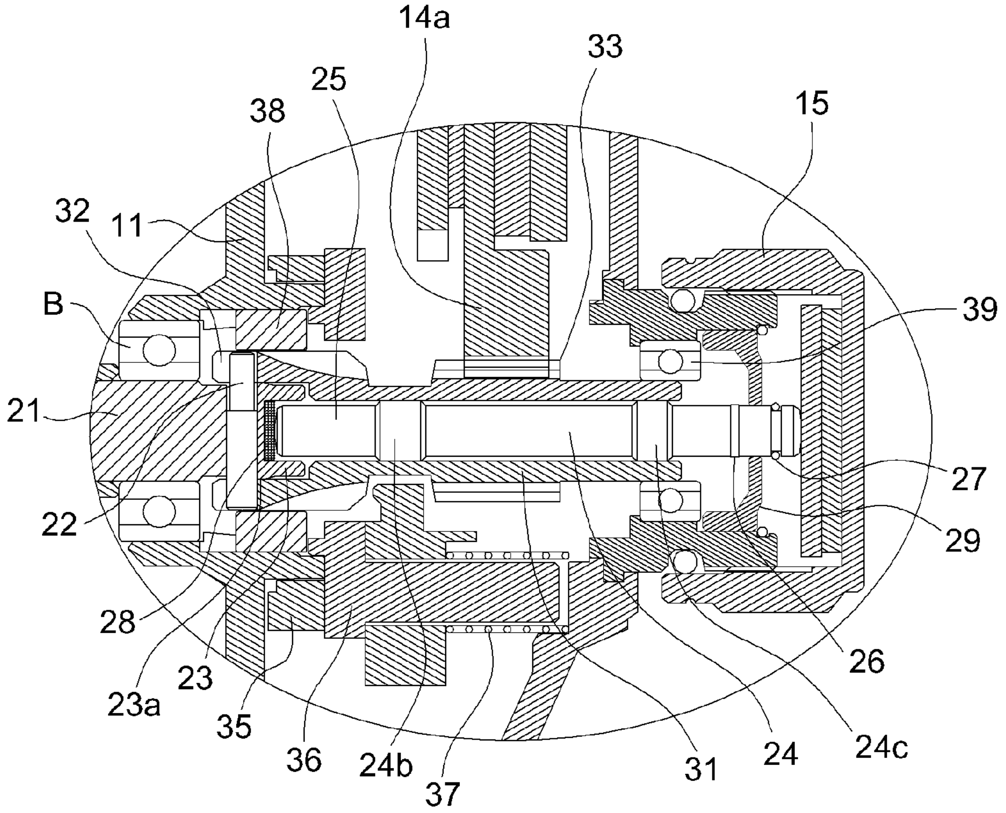
Figure 5B:
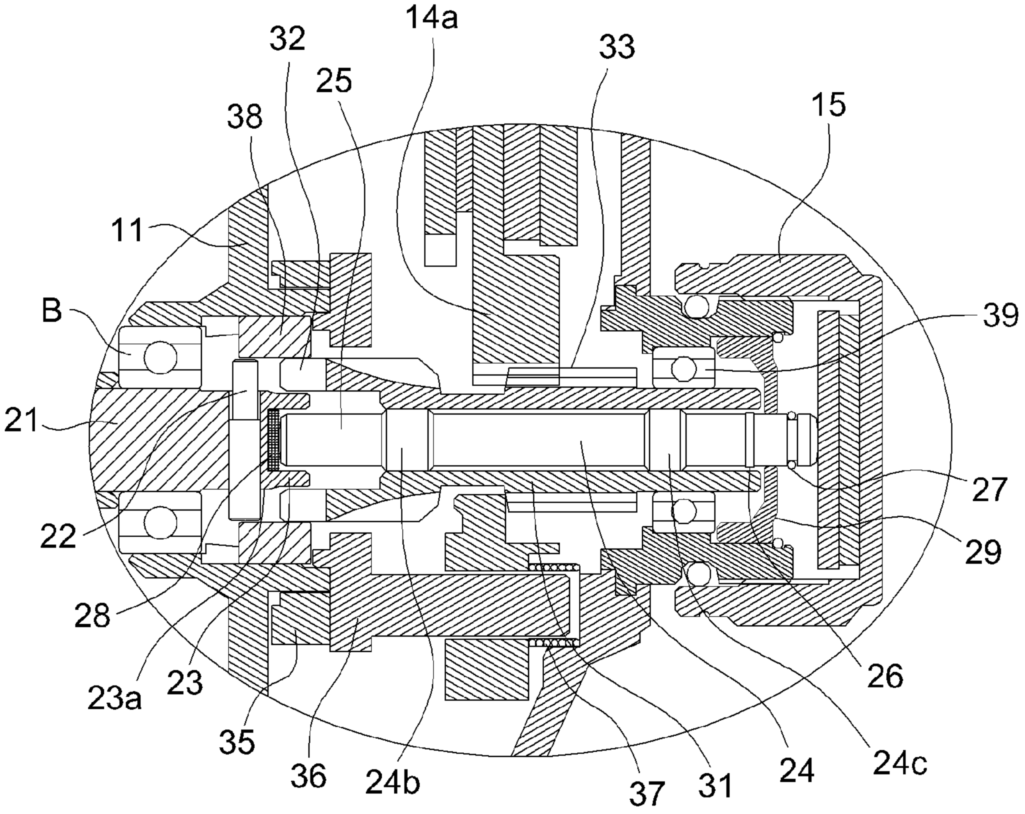

In addition, a modification of the first embodiment to which the separable spool shaft 20 is applied is shown in FIGS. 5A and 5B.

The support means includes the first protrusion 23*a*, which protrudes from the outer circumferential surface of the accommodating portion 23 and being in contact with the inner circumferential surface of the stopper 32 when the pinion is in the clutch-on state. In addition, the support means also includes fourth protrusions 24*b* and 24*c* provided in the pinion shaft 24 and continuously being in contact with the inner circumferential surface of the pinion 31 to support the pinion 31.

That is, as the modification of the first embodiment is a mixture of first protrusion 23*a* and the third protrusion 24*a*, the third protrusion 24*a* supports the pinion 31 only when the pinion 31 is moved forward in the clutch-on state, but the fourth protrusions 24*b* and 24*c* continuously support the pinion in the forward and backward states, regardless of the clutch-on or clutch-off state of the pinion.

The number and positions of the fourth protrusions 24*b* and 24*c* are not limited. As shown in the FIGS. 5A and 5B, the pinion shaft 24 is provided with two fourth protrusions 24*b* and 24*c* at a front end portion of the rear of the head portion 25 and a rear end portion of the front of a separation preventing part 26.

In the modification, the separable spool shaft 20 stably supports the pinion 31 regardless of movement of the pinion 31.

Figure 6:
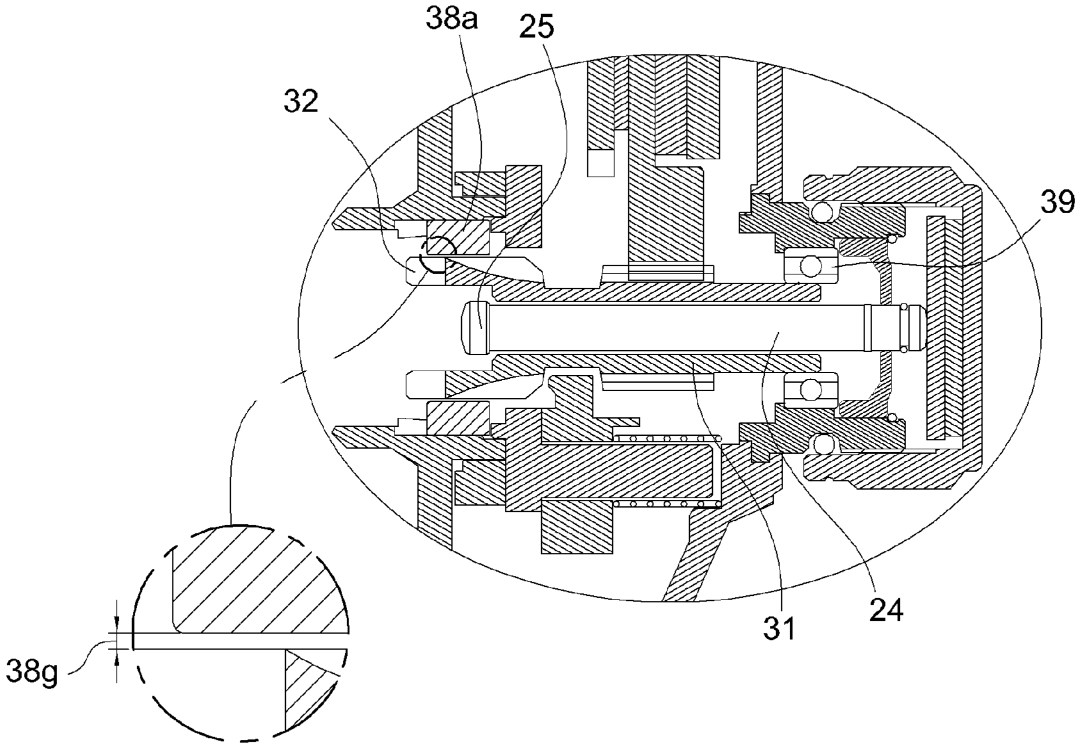

Meanwhile, as shown in FIG. 6, the clutch means 30 includes a friction reducing bushing 38*a* that is in non-contact with the outer circumferential surface of the stopper 32 while covering the outer circumferential surface thereof.

That is, as described above, the second support member 38 may be configured of the friction reducing bushing. Here, an inner diameter of the friction reducing bushing 38*a* is larger than an outer diameter of the stopper 32, so a spacing part 38*g* for providing a gap is provided between the friction reducing bushing 38*a* and the stopper 32 so that the friction reducing bushing 38*a* and the stopper 32 are in non-contact with each other.

Therefore, when the pinion 31 is rotated while the main shaft 21 and the pinion shaft 24 are assembled, the pinion 31 is in non-contact with the friction reducing bushing 38*a*, the front and rear end portions of the pinion 31 are respectively supported only by the support means configured of each protrusion and the first support member 39 configured of the ball-bearing.

When the pinion 31 is rotated while the main shaft 21 and the pinion shaft 24 are removed from each other, the friction reducing bushing 38*a* reduces micro-shaking of the front end portion of the pinion 31, that is, holds the stopper 32 being shaken while the pinion 31 is supported by the first support member 39 configured of the ball-bearing.

Unlike the first support member 39 configured of the ball-bearing, when the friction reducing bushing 38*a* is continuously in contact with the stopper 32 of the pinion 31, foreign matter such as saline may penetrate into the main body 10 and stick to the part. Therefore, the spacing part is provided between an inner circumferential surface of the friction reducing bushing 38*a* and an outer circumferential surface of the stopper 32 using the support means, so that above-described problem can be solved.

In addition, during maintenance of the fishing reel, the pinion 31 may be rotated by manipulating the handle 14 while the main shaft 21 and the pinion shaft 24 including the spool are removed. Here, when the friction reducing bushing 38*a* is omitted for reasons such as foreign matter adherence, since there is no component to support the outer circumferential surface of the stopper 32, the front end portion of the pinion 31 is shaken and causes breakage of other components, including the toothed gear 33. Therefore, in the fishing reel according to the present invention, by using the friction reducing bushing 38*a* covering of the stopper 32 and being in non-contact with the outer circumferential surface thereof with being slightly spaced, shaking of the pinion 31 generated only when the pinion 31 performs free rotation is suppressed, so that foreign matter adherence prevention and pinion support may be simultaneously performed.

When the pinion 31 is rotated by manipulation of the handle while the separable spool shaft 20 (in addition, the integral spool shaft 20') is completely removed, the friction reducing bushing 38*a* prevents the other components from being broken due to free rotation of the pinion 31.

Hereinafter, a second embodiment applying the integral spool shaft 20' will be described with reference to FIGS. 7A to 8B.

The second embodiment of the present invention includes: the integral spool shaft 20' provided such that opposite ends thereof are axially mounted to opposite side covers, and including a main shaft 21 and a pinion shaft 24, the main shaft 21 penetrating a spool S and provided with a fastening pin 22 at a first end portion of the main shaft, and the pinion shaft 24 being integrally connected to the first end portion of the main shaft 21; and a clutch means 30 fitted over the pinion shaft 24 and moved forward and backward in a longitudinal direction of the pinion shaft 24, and including a pinion 31 which is provided with a stopper 32 at a second end portion thereof to be engaged with the fastening pin 22, the pinion controlling rotation of the spool shaft 21' to be on and off, as the stopper 32 is moved forward and backward while being spaced from the fastening pin 22 when the pinion 31 is moved backward in a clutch-off state.

An outer diameter of the pinion shaft 24 is smaller than an inner diameter of the pinion 31, so an outer circumferential surface of the pinion shaft 24 and an inner circumferential surface of the pinion 31 are in non-contact with each other.

The second embodiment of the present invention further includes: a support means provided at the spool shaft 20' and being in contact with the inner circumferential surface of the pinion 31 only when the pinion 31 is moved forward in a clutch-on state; and a first support member 39 continuously supporting the pinion 31 by being in contact with an outer circumferential surface of an end portion of the pinion 31.

That is, the second embodiment differs from the first embodiment in that the integral spool shaft 20' in which the main shaft 21 and the pinion shaft 24 are integrally connected is applied. Therefore, the spool shaft 20' does not have an accommodating portion 23 and a head portion 25.

Figure 7A:
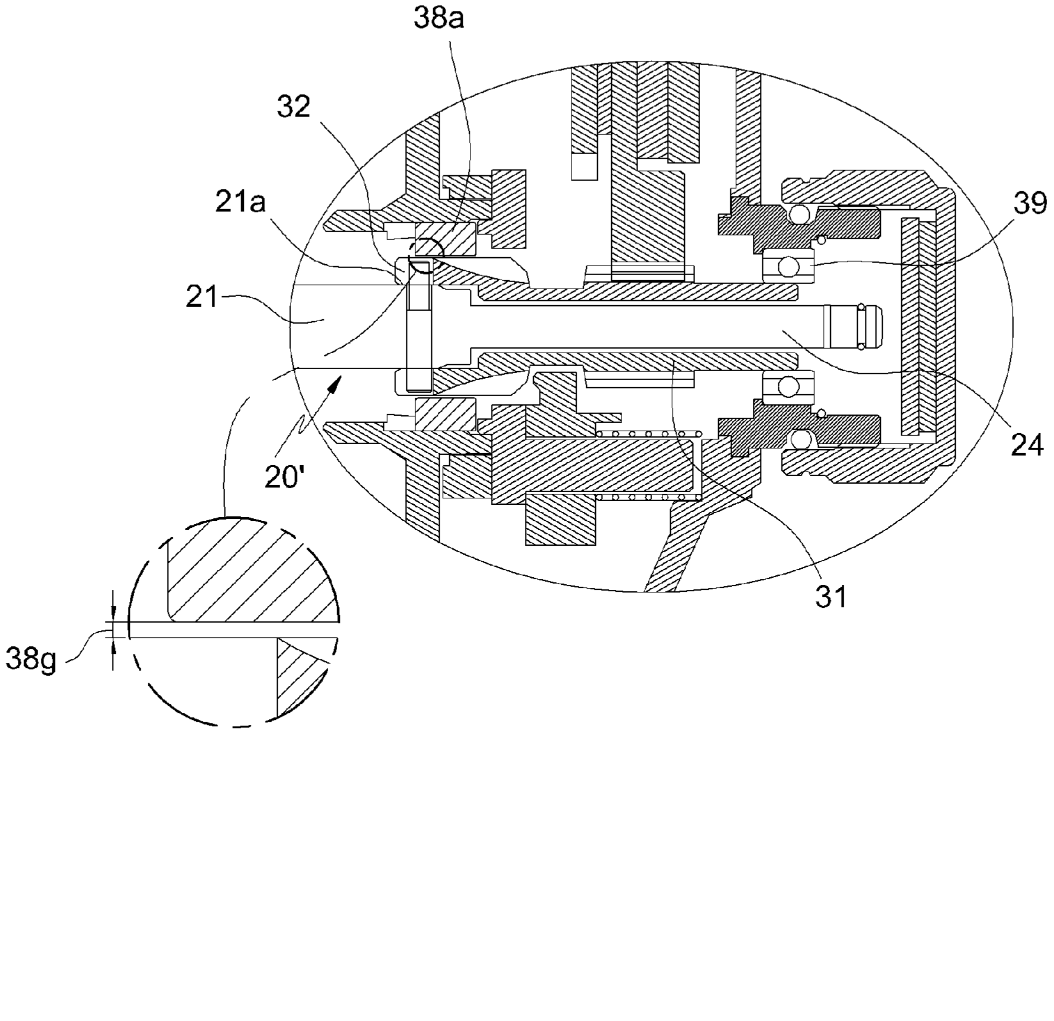
Figure 7B:
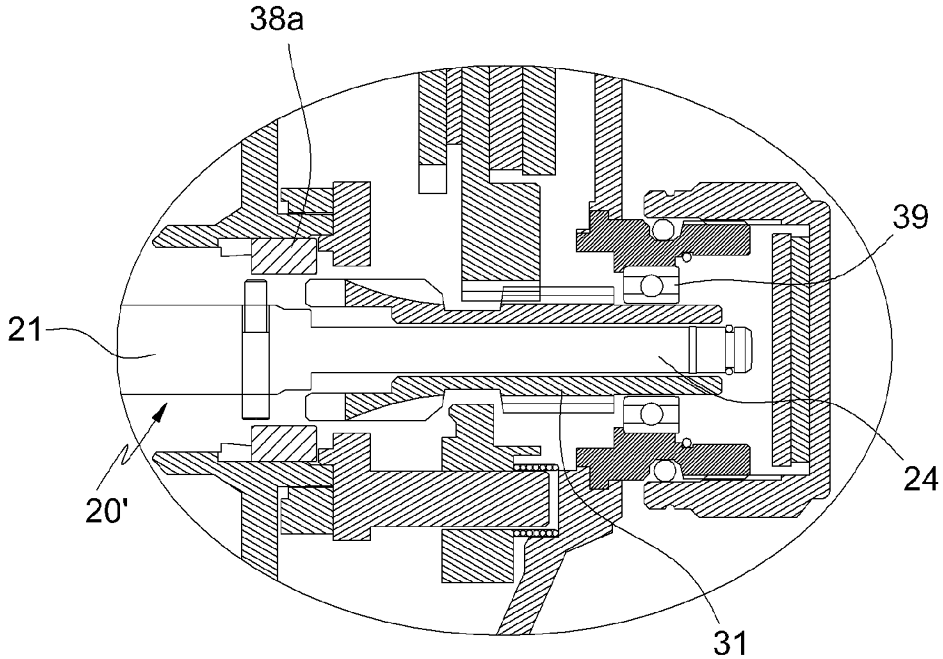

In the second embodiment, due to the integral spool shaft 20', the support means is configured of a first protrusion 21*a* as shown in FIGS. 7A and 7B, the first protrusion 21*a* protruding from an outer circumferential surface of the main shaft 21, and being in contact with an inner circumferential surface of the stopper 32 for supporting.

The first protrusion 21*a* has the same function as the first protrusion 23*a* provided in the accommodating portion 23 in the first embodiment.

The first protrusion 21*a* may be provided such that the main shaft 21 is formed to have the same outer diameter as an inner diameter of the stopper 32, so a part of the main shaft 21 being in contact with the stopper 32 functions as the first protrusion 21*a*.

Alternatively, the outer diameter of the main shaft 21 is formed to be smaller than the inner diameter of the stopper 32, the first protrusion 21*a* with a larger diameter is added to the outer circumferential surface of the main shaft 21.

Figure 8A:
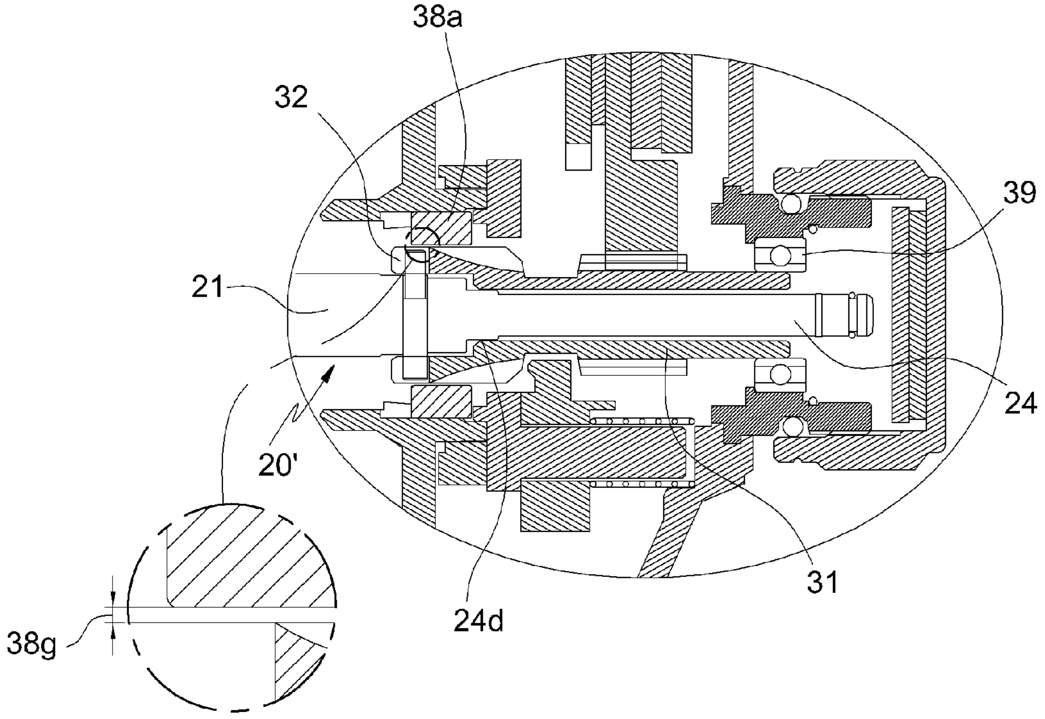
Figure 8B:
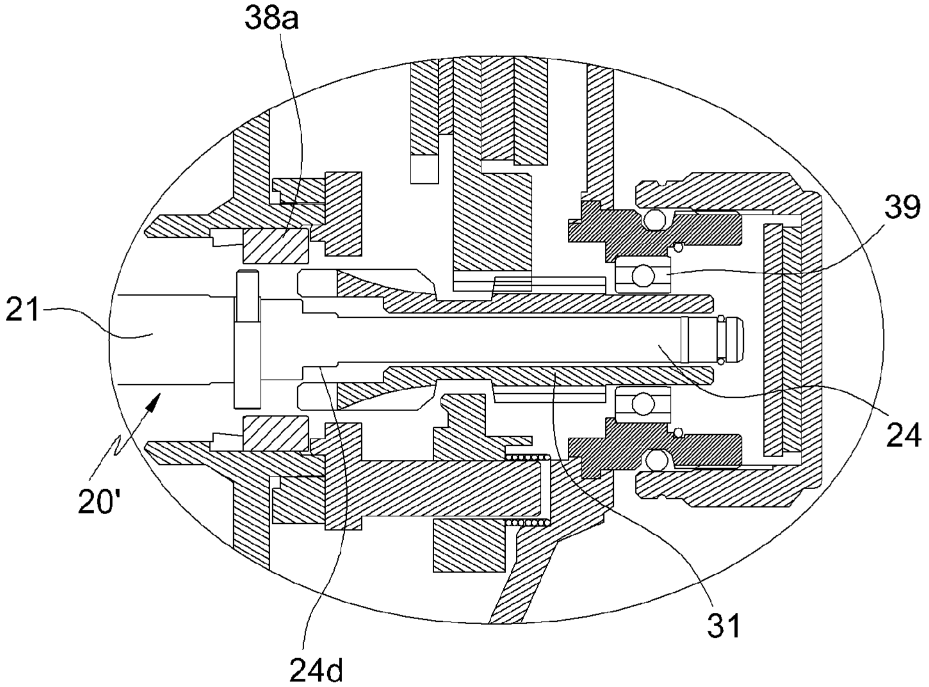
Figure 9A:
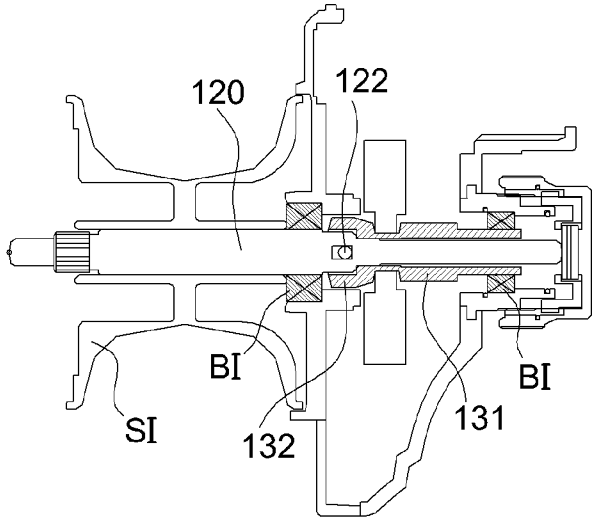
FIGS. 9A and 9B are cross-sectional views showing a main part of a clutch structure according to the related art.
Figure 9B:
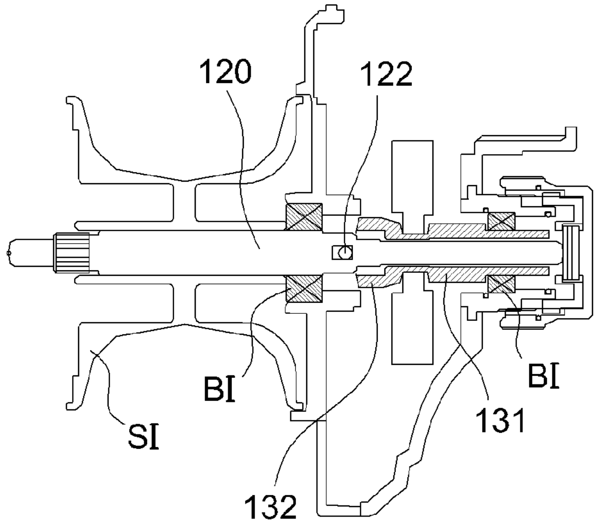

In addition, the support means is configured of a second protrusion 24*d* as shown in FIGS. 8A and 8B, the second protrusion 24*d* is provided such that a part an outer circumferential surface of the pinion shaft 24 has a larger outer diameter than the remaining part of the outer circumferential surface thereof, thereby supporting the pinion 31 while contacting.

That is, the second protrusion 24*d* functions as the second and third protrusions 25*a* and 24*a* provided in the head portion 25 and the pinion shaft 24 in the first embodiment.

Accordingly, in the second embodiment to which the integral spool shaft 20' is applied like the first embodiment, the protrusions 21*a* and 24*d* support the inner circumferential surface of the pinion 31 only when the pinion 31 is moved forward in the clutch-on state.

In the forward state of the pinion 31, axis is prevented from being twisted when the spool shaft 20' is rotated by manipulating the handle 14. In the backward state of the pinion 31, contact and friction occurring between the spool shaft 20' and the pinion 31 is prevented when the spool shaft 20' is rotated.

In addition, in the second embodiment, the first and second support members 39 and 38 and the friction reducing bushing 38*a* described in the first embodiment may be equally applied, and it will be omitted.

According to the present invention having the above-described structure, by performing stable rotation of the spool S by the handle 14, reducing the load, and stably supporting the pinion 31 without friction during casting, it is possible to achieve the object of the present invention of increasing casting distance and reducing noise.

Although the fishing reel having the pinion support structure of the present invention has been described with reference to the accompanying drawings, those skilled in the art will appreciate that various modifications, additions and substitutions are possible, without departing from the scope and spirit of the invention as disclosed in the accompanying claims.

What is claimed is:

1. A fishing reel having a pinion support structure, the fishing reel comprising:

a separable spool shaft provided such that opposite ends thereof are mounted axially between opposite side covers, and including a main shaft and a pinion shaft, the main shaft penetrating a spool and having a fastening pin and an accommodating portion at a first end portion of the main shaft, and the pinion shaft being separated from the first end portion of the main shaft and having a head portion at a second end portion of the pinion shaft, wherein the head portion is inserted into the accommodating portion and idles; and a clutch means fitted over the pinion shaft and moved forward and backward in a longitudinal direction of the pinion shaft, and including a pinion which is provided with a stopper at a second end portion thereof to be engaged with the fastening pin, the pinion controlling rotation of the main shaft to be turned on and off, as the stopper is spaced apart from the accommodating portion and moved forward and backward in a backward state at which the pinion is in a clutch-off state, wherein the pinion shaft has a smaller outer diameter than an inner diameter of the pinion, an outer circumferential surface of the pinion shaft and an inner circumferential surface of the pinion are in non-contact with each other, and the fishing reel further comprises:

a support means provided at the spool shaft, and supporting the pinion by being in contact with the inner circumferential surface of the pinion only in a forward state at which the pinion is in clutch-on state; and a first support member continuously supporting the pinion by being in contact with an outer circumferential surface of one end portion of the pinion.

2. The fishing reel of claim 1, wherein the support means is configured of a first protrusion, which protrudes from an outer circumferential surface of the accommodating portion and is in contact with an inner circumferential surface of the stopper.

3. The fishing reel of claim 1, wherein the support means is configured of a second protrusion, which protrudes so that an outer diameter of the head portion is larger than the outer diameter of the pinion shaft and is extended to be exposed toward one side of the accommodating portion, thereby being in contact with the inner circumferential surface of the pinion.

4. The fishing reel of claim 1, wherein the support means is configured of a third protrusion, which protrudes so that a part of the outer circumferential surface of the pinion shaft has a larger outer diameter than the remaining part of the outer circumferential surface thereof, thereby being in contact with the inner circumferential surface of the pinion.

5. The fishing reel of claim 1, further comprising:

a friction reducing bushing which is in non-contact with an outer circumferential surface of the stopper while covering the outer circumferential surface thereof.

6. The fishing reel of claim 1, further comprising:

a second support member which supports the pinion by being in contact with an outer circumferential surface of the stopper.

7. A fishing reel having a pinion support structure, the fishing reel comprising:

a separable spool shaft provided such that opposite ends thereof are mounted axially between opposite side covers, and including a main shaft and a pinion shaft, the main shaft penetrating a spool and having a fastening pin and an accommodating portion at a first end portion, and the pinion shaft being separated from the first end portion of the main shaft and having a head portion at a second end portion, wherein the head portion idling in the accommodating portion; and a clutch means fitted over the pinion shaft and moved forward and backward in a longitudinal direction of the pinion shaft, and including a pinion provided with a stopper at a second end portion thereof to be engaged with the fastening pin, the pinion controlling rotation of the main shaft to be turned on and off, as the stopper is spaced apart from the accommodating portion and moved forward and backward in a backward state at which the pinion is in a clutch-off state, wherein the pinion shaft has an outer diameter smaller than an inner diameter of the pinion, and an outer circumferential surface of the pinion shaft and an inner circumferential surface of the pinion are in non-contact with each other, and the fishing reel further comprises:

a support means protruding from an outer circumferential surface of the accommodating portion, and configured of a first protrusion supporting the pinion by being in contact with an inner circumferential surface of the stopper only in a forward state at which the pinion is in a clutch-on state, and of a fourth protrusion provided at the spool shaft and continuously supporting the pinion by being in contact with the inner circumferential surface of the pinion; and a first support member continuously supporting the pinion by being in contact with an outer circumferential surface of one end portion of the pinion.

* * * * *